United States Patent
Richter et al.

(10) Patent No.: US 6,533,569 B2
(45) Date of Patent: Mar. 18, 2003

(54) INTERCHANGEABLE CAVITY RING FOR CD MOLDS

(75) Inventors: J. Hans Richter, Lancaster, PA (US); Michael J. Selems, Terre Haute, IN (US); Alexander I. Kara, Lancaster, PA (US)

(73) Assignee: Richter Precision, Inc., East Petersburg, PA (US)

( * ) Notice: Subject to any disclaimer, the term of this patent is extended or adjusted under 35 U.S.C. 154(b) by 0 days.

(21) Appl. No.: 09/800,228

(22) Filed: Mar. 6, 2001

(65) Prior Publication Data

US 2003/0012840 A1 Jan. 16, 2003

(51) Int. Cl.[7] ............................................. B29D 11/00
(52) U.S. Cl. .................. 425/192 R; 425/542; 425/810; 425/DIG. 129
(58) Field of Search ........................... 425/192 R, 542, 425/810, DIG. 129; 264/106, 107

(56) References Cited

U.S. PATENT DOCUMENTS

| 4,120,597 A | * 10/1978 | Millard | 403/24 |
|---|---|---|---|
| 5,346,654 A | 9/1994 | Kodaka et al. | 264/1.33 |
| 5,693,348 A | 12/1997 | Sakamoto et al. | 425/436 |
| 5,852,598 A | 12/1998 | Wiest | 369/272 |
| 5,882,555 A | 3/1999 | Rohde et al. | 264/1.33 |
| 5,942,165 A | 8/1999 | Sabatini | 264/1.33 |
| D419,152 S | 1/2000 | Lowenstein | D14/121 |
| 6,143,231 A | * 11/2000 | DiSimone | 264/313 |

FOREIGN PATENT DOCUMENTS

JP           2-295711     * 12/1990

* cited by examiner

*Primary Examiner*—Jan H. Silbaugh
*Assistant Examiner*—Donald Heckenberg
(74) *Attorney, Agent, or Firm*—Martin Fruitman

(57) ABSTRACT

The invention is a compact disc manufacturing mold which permits the mold to be used to produce a variety of non-standard sizes and shapes. A replaceable flat cavity ring which fits between the conventional mold pieces encloses the outer boundary of the disc and has an inner shape which defines the non-standard disc shape. The cavity ring includes a cylindrical projection extending from its surface which is in contact with the face of the mold piece. The extension is inserted into a groove in the mold face and is locked into the mold by threaded plugs screwed through the cylindrical sides of the mold piece.

6 Claims, 1 Drawing Sheet

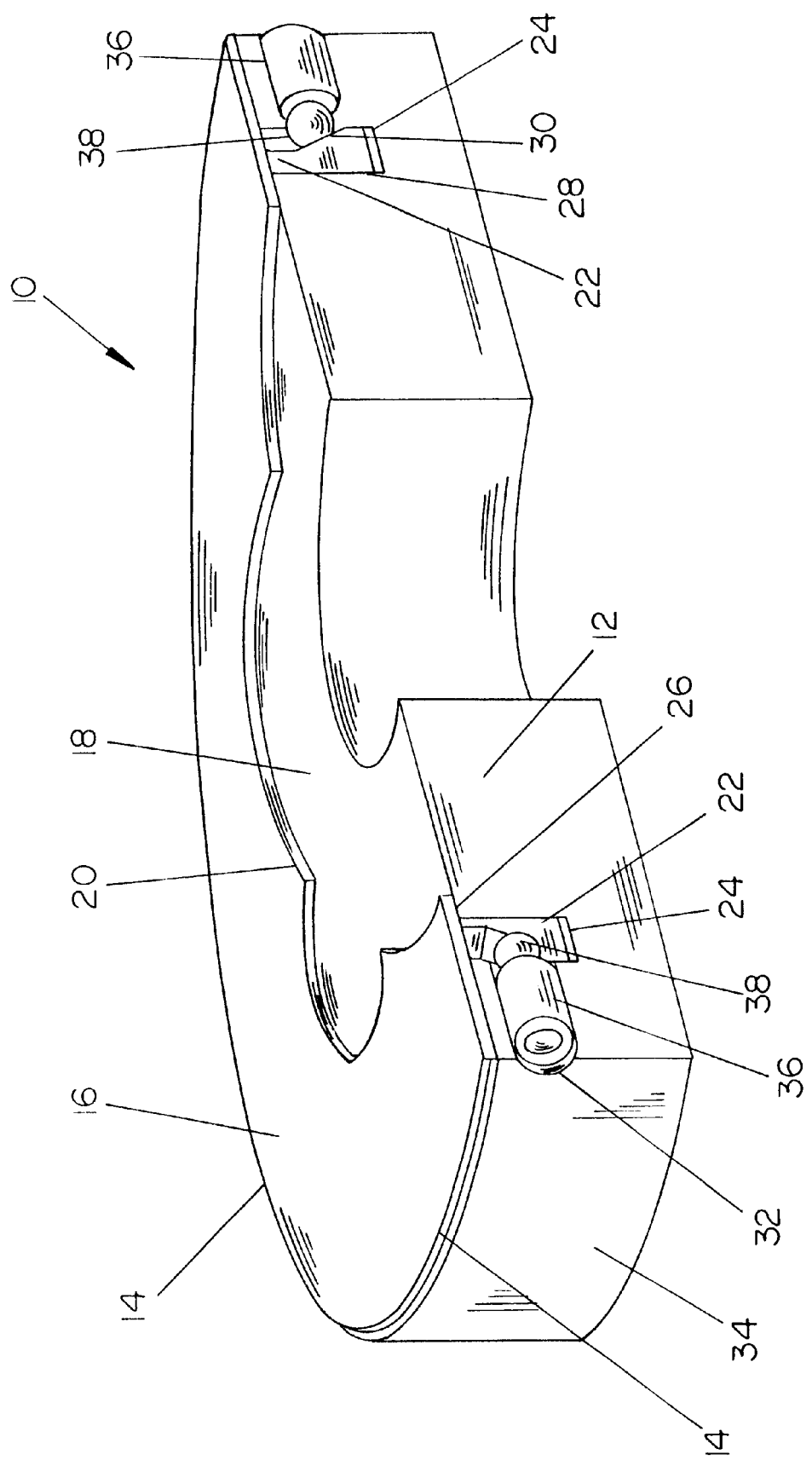

INTERCHANGEABLE CAVITY RING FOR CD MOLDS

BACKGROUND OF THE INVENTION

This invention deals generally with molds for manufacturing compact discs, digital video discs, and similar optical data recording discs, and more specifically with a mold which permits the molding of a variety of non-circular discs in a single mold assembly.

The compact music disc and computer program disc, both referred to as CDs, and the digital video disc commonly referred to as a DVD, have become very familiar in our culture. Most users understand that the data is somehow recorded and then read from such discs by the use of lasers, and, in fact, the user needs to know nothing more. Actually, the typical prerecorded disc is molded of plastic in a mold which forms a series of microscopic plateaus and valleys on one face of the disc in a pattern of very tight spiraling bands. In the CD or DVD player, or in the computer, the reflection of laser light from the series of plateaus and valleys is read to retrieve the data recorded on the disc. It is the variation in the pattern of plateaus which defines the data.

The prerecorded disc which is played on an audio CD player or is read by the computer is not formed directly by a laser, because such a process would be far too slow for mass production. Instead, a process using a laser beam is used to produce a master which is then used to produce a mold with the plateaus and valleys in a reverse pattern, and that mold is used as one of two faces of a mold into which hot fluid plastic is injected and compressed. Once the resulting disc is cooled the plateaus and valleys are duplicates of the original master. This general approach is surprisingly similar to the method used for many years for producing phonograph records, except that the use of lasers, new materials, and digital information produces a much smaller pattern which yields much higher resolution and permits vastly more information to be recorded on a disc.

There is also another aspect of the new technology of CD and DVD discs which is so different from that of phonograph records that it is difficult to accept it. Most of us are not yet aware that CDs and DVDs can be and are produced in non-circular shapes. Since, unlike the phonograph needle, the laser reading system requires no physical contact with the disc, and its placement on the disc is computer, not mechanically, controlled, there is no problem if sections of the disc are simply not there to be read. Such non-circular CDs are already being used, particularly for advertising and promotion. As a simple example, a CD which is essentially the shape of and appears to be a business card can actually furnish a potential customer detailed information on products.

There have been some patents which recognize this new approach to CDs, and some have disclosed methods of making them. U.S. Pat. No. 5,882,555 by Rohde et al discloses making non-circular CDs by grinding away portions of a molded round disc. U.S. Pat. No. 5,852,598 by Wiest discloses CDs which interlock like jigsaw puzzles, but does not suggest any method of making them, and U.S. Design Pat. No. 419,152 by Lowenstein shows CDs which are basically circular with chords trimmed off. U.S. Pat. No. 5,942,165 by Sabatini even suggests molding a non-circular CD, but it does not disclose any method or apparatus for doing so.

There does appear to be one mold available in industry from an unknown source which is used to mold non-circular CDs. That unit uses a flat ring located between the two faces of the CD mold with the interior boundaries of the ring defining a non-circular cavity for the CD. In effect, the flat cavity ring substitutes for a portion of the CD around the outer circumference of the mold so that the hot plastic does not fill in the portion of the mold in which the flat cavity ring is located, and the CD is not formed there.

However, this cavity ring is attached to the lower mold face by the use of simple flat head screws which penetrate the ring and are threaded into the lower mold face. This method of construction causes problems in operation and life span of the mold. Since the mold is subjected to repeated and severe pounding by the upper mold and to drastic temperature variations by the hot plastic being injected into the mold and then cooled, there is a tendency for the screws holding the cavity ring to loosen. If that occurs and a screw rises from its hole even slightly, the upper face of the mold will be damaged, and the entire mold will be unusable.

It would be very beneficial to have a cavity ring which did not require holes through the cavity ring to install it, and did not risk destruction of the upper face of the mold from loose fasteners.

SUMMARY OF THE INVENTION

The present invention avoids the potential damage to the mold by capturing a protrusion from the surface of the cavity ring within an annular groove within the mold face to which the ring is attached. The flat portion of the cavity ring of the invention has an annular area with a circular outer edge to fit into existing mold assemblies, and the annular area has an inner boundary which defines the cavity that is used to contain the hot plastic to be molded. The cavity can be of any shape, including circular, rectangular, oval, or scalloped shapes.

The flat annular cavity ring has a cylindrical extension protruding from one of its surfaces. In the preferred embodiment of the invention this cylindrical extension has an inner surface which is perpendicular to the bottom surface of the flat cavity ring, but the extension has an outer surface which is more complex in that it includes a slope that makes the extension wider at the end remote from the cavity ring than at the end attached to the cavity ring.

The extension fits into a groove in the face of the mold piece to which the cavity ring is attached. The groove is formed in the face of the mold piece and is slightly deeper than the height of the extension from the cavity ring, and, in order to accept the extension, the groove is as wide as the widest part of the extension, the end which is remote from the flat cavity ring. When the extension is inserted into the groove, the face of the flat cavity ring has no exposed attachment devices.

Instead, the cavity ring is held in place by several threaded plugs inserted through the cylindrical sides of the mold piece. Each threaded plug forces a ball against the sloping surface of the extension of the cavity ring. The plug thereby provides a vector force in the direction which would push the extension deeper into the groove, and thus locks the cavity ring tightly against the mold face.

All that is required to replace the flat cavity ring in order to mold a new shape disc is to unthread the several plugs in the sides of the mold piece, remove the installed flat cavity ring, place the extension of a new cavity ring in the annular groove, and replace and tighten the threaded plugs and the balls.

The present invention thereby furnishes a replaceable flat annular cavity ring which has no exposed attachment devices, and, furthermore, it uses an attachment device which has no tendency to loosen under the severe conditions of use in a CD mold.

BRIEF DESCRIPTION OF THE DRAWING

The FIGURE is a cutaway perspective view of the cavity ring of the invention installed within a mold piece.

DETAILED DESCRIPTION OF THE INVENTION

The FIGURE is a cutaway perspective view of the preferred embodiment of the invention in which disc mold assembly 10 includes lower mold piece 12, sometimes called the "read side" or the "signal side" mold piece, cavity ring 14, and the securing means for cavity ring 14. When the invention is in use, an upper mold piece (not shown) is pressed down upon top surface 16 of cavity ring 14 as hot plastic (not shown) is injected into cavity 18 defined by inner boundary 20 of cavity ring 14. The upper mold assembly (not shown) is usually called the "stamper" side of the mold. The invention deals only with the structure of lower mold piece 12 and cavity ring 14. Cavity ring 14 is used in a disc mold to permit the molding of reduced size or unique shaped CDs and DVDs.

As can be seen in the FIGURE, inner boundary 20 of cavity ring 14 need not be circular, and cavity 18 which is determined by inner boundary 20 is shown in the FIGURE as a scalloped shape. In fact, inner boundary 20 and the finished molded CD can be virtually any size or shape, including circles, rectangles, ellipses, or circles with chords trimmed off them.

The preferred embodiment of the invention eliminates any attachment means which affects upper face 16 of cavity ring 14. This is accomplished by attaching cavity ring 14 to lower mold piece 12 by the use of extension 22 of cavity ring 14 which is inserted into annular groove 24 within mold piece 12. Extension 22 protrudes from lower surface 26 of cavity ring 14. While annular groove 24 has a simple cylindrical shape with straight vertical sides and a flat bottom, extension 22 is shaped to facilitate locking it into groove 24. Therefore, inner surface 28 of extension 22 is formed as a straight cylindrical surface which is perpendicular to the plane of cavity ring 14, and it matches with and fits against the innermost surface of groove 24. However, outer surface 30 of extension 22 is sloped so that extension 22 is wider at its end remote from cavity ring 14 than at its end attached to cavity ring 14.

To use sloped outer surface of extension 22 in locking cavity ring 14 in place, several holes 32 are formed in mold piece 12 penetrating cylindrical outside surface 34 of mold piece 12 and into groove 24. These holes 32 are located in a pattern around outside surface 34 and at a distance from cavity ring 14 such that the centers of holes 32 intersect outer sloping surface 30 of extension 22. Holes 32 are threaded to accept plugs 36 which are also threaded and screwed into holes 32. To lock cavity ring 14 tightly onto the face of mold piece 12, balls 38 are placed in holes 32 between threaded plugs 36 and sloping surface 30 of extension 22. As plugs 36 are tightened into holes 32, balls 38 are pushed against sloping surface 30 of extension 22, and the vector forces produced force extension 22 down and cavity ring 14 tightly against mold piece 12. This apparatus for holding cavity ring 14 in place is not affected by the repeated impacts against cavity ring 14 from the other mold piece (not shown) because the attachment depends upon the threads on plugs 36 which are oriented transverse to the forces applied by the repeated impacts.

The invention thereby provides a conveniently interchangeable cavity ring which is locked into place on a mold piece without concern for it loosening and damaging the mold.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, plugs 36 and balls 38 could be replaced with other attachment devices and extension 22 can be constructed with a different shape or with separate segments.

What is claimed as new and for which Letters Patent of the United States are desired to be secured is:

1. A mold for producing optical discs comprising:
   a mold piece with a mold face for contact with a disc to be molded, sides oriented transverse to the mold face, and at least one face cavity penetrating the mold face;
   a cavity ring comprising a flat annular ring with one surface in contact with the mold face and an inner boundary defining a mold cavity to hold hot plastic that is used to form a molded disc;
   an extension extending transversely from the surface of the cavity ring which is in contact with the mold face, with the extension located so that the extension fits into a said face cavity penetrating the mold face when the cavity ring is in contact with the mold face; and
   attachment means located in holes in the sides of the mold piece with the attachment means constructed to contact the cavity ring's extension when the extension is within said face cavity in the mold face and to lock the cavity ring against the mold face.

2. The mold of claim 1 wherein the face cavity of the mold face is an annular groove.

3. The mold of claim 1 wherein the attachment means are plugs threaded into the holes in the sides of the mold piece.

4. The mold of claim 1 wherein the attachment means are plugs threaded into the holes in the sides of the mold piece and balls within the holes are forced against the extension.

5. The mold of claim 1 wherein a slope is formed on the extension so that the end of the extension remote from the cavity ring is wider than the end of the extension attached to the cavity ring, and the attachment means is forced against the slope.

6. The mold of claim 1 wherein the inner boundary of the cavity ring is non-circular to define a mold cavity which will form a non-circular disc.

* * * * *